United States Patent
Yang et al.

(10) Patent No.: US 9,692,084 B2
(45) Date of Patent: Jun. 27, 2017

(54) ELECTROLYTE FOR MAGNESIUM CELL AND MAGNESIUM CELL CONTAINING THE ELECTROLYTE

(71) Applicants: Jun Yang, Shanghai (CN); Feifei Wang, Shanghai (CN); Yongsheng Guo, Shanghai (CN); Yanna Nuli, Shanghai (CN)

(72) Inventors: Jun Yang, Shanghai (CN); Feifei Wang, Shanghai (CN); Yongsheng Guo, Shanghai (CN); Yanna Nuli, Shanghai (CN)

(73) Assignees: TOYOTA JIDOSHA KABUSHIKI KAISHA, Toyota (JP); SHANGHAI JIAO TONG UNIVERSITY, Shanghai (CN)

( * ) Notice: Subject to any disclaimer, the term of this patent is extended or adjusted under 35 U.S.C. 154(b) by 221 days.

(21) Appl. No.: 14/405,499

(22) PCT Filed: Jun. 7, 2013

(86) PCT No.: PCT/CN2013/076903
§ 371 (c)(1),
(2) Date: Dec. 4, 2014

(87) PCT Pub. No.: WO2013/185562
PCT Pub. Date: Dec. 19, 2013

(65) Prior Publication Data
US 2015/0140451 A1 May 21, 2015

(30) Foreign Application Priority Data

Jun. 11, 2012 (CN) .......................... 2012 1 0206354

(51) Int. Cl.
*H01M 10/05* (2010.01)
*H01M 10/0568* (2010.01)
(Continued)

(52) U.S. Cl.
CPC ..... *H01M 10/0568* (2013.01); *H01M 10/054* (2013.01); *H01M 10/0569* (2013.01);
(Continued)

(58) Field of Classification Search
None
See application file for complete search history.

(56) References Cited

U.S. PATENT DOCUMENTS

| 6,316,141 B1 | 11/2001 | Aurbach et al. |
| 2011/0159381 A1* | 6/2011 | Doe ........................ H01M 4/13 429/337 |

FOREIGN PATENT DOCUMENTS

JP 2004-259650 A 9/2004

OTHER PUBLICATIONS

Wang et al, A novel electrolyte system without a Grignard reagent for rechargeable magnesium batteries, Chem. Commun., 2012, 48, 10763-10765, published Oct. 8, 2012.*
(Continued)

*Primary Examiner* — Scott J Chmielecki
(74) *Attorney, Agent, or Firm* — Oliff PLC

(57) ABSTRACT

An electrolyte for a magnesium cell contains a solute, which is phenoxyl-Mg—Al-halogen complex, and an ether solvent. With respect to the entire electrolyte, the solute concentration is 0.2 to 1 mol/L. The electrolyte is capable of staying stable in the air. Also provided is a magnesium cell containing the electrolyte.

8 Claims, 3 Drawing Sheets

(51) Int. Cl.
*H01M 10/36* (2010.01)
*H01M 10/054* (2010.01)
*H01M 10/0569* (2010.01)
*H01M 4/46* (2006.01)

(52) U.S. Cl.
CPC ............ *H01M 10/36* (2013.01); *H01M 4/466* (2013.01); *H01M 2300/0028* (2013.01)

(56) References Cited

OTHER PUBLICATIONS

Wang et al, A novel electrolyte system without a Grignar reagent for rechargeable magnesium batteries, Chem. Commun., 2012, 48, 10763-10675, published Oct. 8, 2012.*
Gregory et al., "Nonaqueous Electrochemistry of Magnesium," J. Electrochem. Soc., vol. 137, No. 3, pp. 775-780, Mar. 1990.
Besenhard et al., "Advances in Battery Technology: Rechargeable Magnesium Batteries and Novel Negative-Electrode Materials for Lithium Ion Batteries," Chemphyschem, vol. 3, pp. 155-159, 2002.
Levi et al., "On the Way to Rechargeable Mg Batteries: The Challenge of New Cathode Materials," Chemistry of Materials, vol. 22, pp. 860-868, 2010.
Lossius et al., "Plating of Magnesium from Organic Solvents," Electrochimica Acta., vol. 41, No. 3, pp. 445-447, 1996.
Aurbach et al., "A Comparison Between the Electrochemical Behavior of Reversible Magnesium and Lithium Electrodes," Journal of Power Sources, vol. 97-98, pp. 269-273, 2001.
Liebenow et al., "The Electrodeposition of Magnesium Using Solutions of Organomagnesium Halides, Amidomagnesium Halides and Magnesium Organoborates," Electrochemistry Communications, vol. 2, pp. 641-645, 2000.
Guo et al., "Study of Electronic Effect of Grignard Reagents on their Electrochemical Behavior," Electrochemistry Communications, vol. 12, pp. 1671-1673, 2010.
Aurbach et al., "Prototype Systems for Rechargeable Magnesium Batteries," Letters to Nature, vol. 407, pp. 724-727, Oct. 12, 2000.
Mizrahi et al., "Electrolyte Solutions with a Wide Electrochemical Window for Rechargeable Magnesium Batteries," Journal of The Electrochemical Society, vol. 155, No. 2, pp. A103-A109, 2008.

\* cited by examiner

ELECTROLYTE FOR MAGNESIUM CELL AND MAGNESIUM CELL CONTAINING THE ELECTROLYTE

FIELD OF THE INVENTION

The present invention relates to an electrolytic solution for a magnesium cell, and a magnesium cell including the electrolytic solution.

BACKGROUND OF THE INVENTION

Magnesium, which is an active light metal, has a diagonal relationship with lithium, has a similar ionic radius to that of lithium, and also has similar chemical properties to those of lithium. Since a metallic magnesium negative electrode has a relatively high theoretical specific capacity (2205 mAh/g), is inexpensive and high in melting point (649° C.), is easily processed, and is also environmentally-friendly, a magnesium secondary battery in which magnesium is used for a negative electrode is increasingly attracting attention (see Non-Patent Documents 1 to 3). A magnesium secondary battery is superior in terms of cost and energy density to a lithium ion cell and thus is a promising eco-friendly battery and is expected to serve as a high-capacity power battery system for the next generation (see Non-Patent Documents 4 and 5).

Conventionally, the development of a magnesium secondary battery has been restricted by two factors. The first factor is as follows: while both of a magnesium ion and a lithium ion have a small ionic radius, a magnesium ion has a higher charge and undergoes a strong solvation action, and therefore no or few substrates are available that allow the insertion of magnesium ions, thus limiting the selection of positive electrode materials. The second factor is as follows: magnesium forms a passive film in most electrolytic solutions, and this passive film is a poor conductor for $Mg^{2+}$ ions. Therefore, it is difficult to prepare a magnesium secondary battery electrolytic solution system having a high reversible deposition-dissolution rate of magnesium and a wide electrochemical window, inhibiting the development of a magnesium secondary battery.

A magnesium electrode forms no passive film in a Grignard reagent/ether solution and is also excellent in reversible deposition properties of magnesium, but a common Grignard reagent, of which the stable electrochemical window is narrow, cannot be easily applied to a magnesium secondary battery (see Non-Patent Documents 6 and 7). In 2000, Nature journal disclosed a novel electrolytic solution system that can be applied to a magnesium secondary battery, researched and developed by Aurbach (Israeli scientist) et al. (see Non-Patent Document 8), and disclosed that magnesium can be reversibly deposited from an ether solution of $Mg(AX_{4-n}R_n)_2$, where A=Al, B, As, P, Sb or the like, X=Cl or Br, R represents an alkyl group, 0<n<4, and n'+n"=n. This novel formulation is considered to have been obtained by the reaction of a Lewis acid RR'Mg with a Lewis salt $AX_{3-n}R_nR'_{n''}$, and was named as "first generation electrolytic solution" by the D. Aurbach team. This system has a significantly enhanced conductivity in a 0.3 to 0.5 M electrolyte solution at room temperature and has a significantly improved anodic stability as compared with the case of a Grignard reagent. At the end of year 2007, the Aurbach team succeeded in synthesis of a magnesium-aluminum-halogen complex, in which all ligands are phenyl groups, in an electrolytic THF solution system and such an electrolytic solution system was referred to as "second generation electrolytic solution" (see Non-Patent Document 9). The electrolytic solution was obtained by reacting PhMgCl as a Lewis salt and $AlCl_3$ as a Lewis acid in a ratio of 2:1 in tetrahydrofuran solvent, and the electrochemical window thereof was 3 V or more, the overpotential thereof in magnesium deposition was less than 0.2 V, and the conductivity of the solution was clearly enhanced as compared with conventional systems. The Grignard reagent, PhMgCl, in the electrolytic solution, however, is highly reductive and must be measured and stored in conditions of no moisture and isolation from air, and thus the range of application for the system is limited.

Non-Patent Document 1: Gregory T D, Hoffman R J, Winterton R C, Development of an ambient secondary magnesium cell, Journal of the Electrochemical Society, 1990, 137(3): 775-780

Non-Patent Document 2: Besenhard J O, Winter M, Advances in cell technology: rechargeable magnesium cells and novel negative electrode materials for lithium ion cells, Chemphyschem, 2002, 3(2): 155-159

Non-Patent Document 3: Levi E, Gofer Y, Aurbach D, On the Way to Rechargeable Mg Cells: The Challenge of New Cathode Materials, Chemistry of Materials, 2010, 22(3): 860-868

Non-Patent Document 4: Lossius L P, Emmenegger F, Plating of magnesium from organic solvents, Electrochimica Acta, 1996, 41(3): 445-447

Non-Patent Document 5: Aurbach D, Gofer Y, Lu Z, et al. A comparison between the electrochemical behavior of reversible magnesium and lithium electrodes, Journal of Power Sources, 2001, 97(8): 269-273

Non-Patent Document 6: Liebenow C, Yang Z, Lobitz P, The electrodeposition of magnesium using solutions of organomagnesium halides, amidomagnesium halides and magnesium organoborates, Electrochemistry Communications, 2000, 2(9): 641-645

Non-Patent Document 7: Guo Y S, Yang J, NuLi Y N, Study of electronic effect of Grignard reagents on their electrochemical behavior, Electrochemistry Communications, 2010, 12(2): 1671-1673

Non-Patent Document 8: Aurbach D, Lu Z, Schechter A, Prototype system for rechargeable magnesium cells, Nature, 2000, 407(6805): 724-727

Non-Patent Document 9: Oren Mizrahi, Nir Amir, Aurbach D, Electrolyte Solutions with a Wide Electrochemical Window for Rechargeable Magnesium Cells, Journal of The Electrochemical Society, 2007, 155(2); A103-A109

SUMMARY OF THE INVENTION

An objective of the present invention is to provide a novel electrolytic solution for a magnesium cell, which solves the above problems, exists stably in air, and broadens the selection of positive electrode materials, as well as a magnesium cell including the electrolytic solution.

To achieve the foregoing objective and in accordance with one aspect of the present invention, an electrolytic solution for a magnesium cell is provided that contains a solute, which is phenoxyl-Mg—Al-halogen complex, and an ether solvent.

In the above described electrolytic solution for a magnesium cell, the solute is preferably a reaction product of a Lewis salt, which is ROMgX, and a Lewis acid, which is $AlCl_3$, wherein R represents an aryl group optionally substituted with fluorine and/or an alkyl group, and X represents halogen.

Further, R preferably represents a phenyl group optionally substituted fluorine and/or with an alkyl group.

In the above described electrolytic solution for a magnesium cell, wherein a molar ratio of the ROMgX to the AlCl₃ is preferably 1 to 3.

In the above described electrolytic solution for a magnesium cell, a concentration of the solute in the entire electrolytic solution is preferably 0.2 to 1 mol/L.

In the above described electrolytic solution for a magnesium cell, the ROMgX is preferably at least one selected from the group consisting of

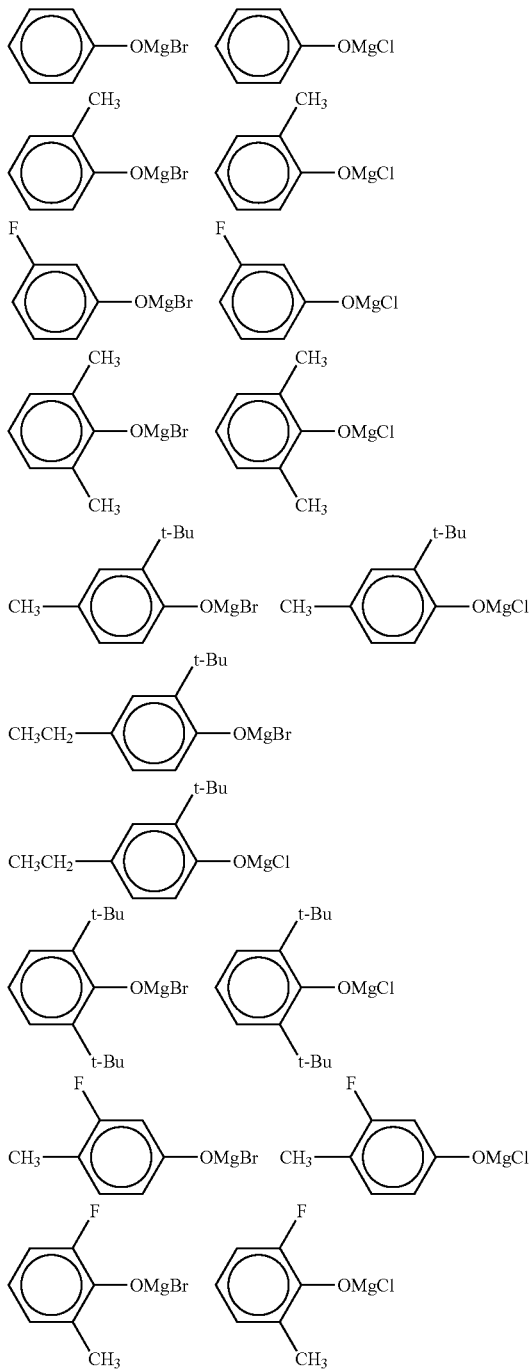

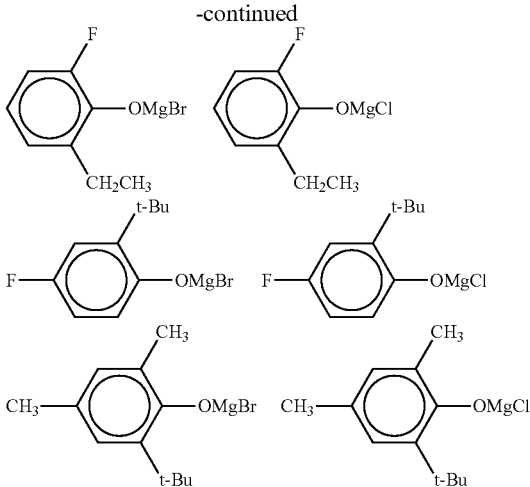

In the above described electrolytic solution for a magnesium cell, the ether solvent is preferably at least one selected from the group consisting of tetrahydrofuran, ethylene glycol dimethyl ether, diethylene glycol dimethyl ether, 2-methyltetrahydrofuran, ethyl ether, and tetraethylene glycol dimethyl ether.

In accordance with another aspect of the present invention, a magnesium cell comprising the above described electrolytic solution is provided.

The present invention provides a novel electrolytic solution for a magnesium cell, which can exist stably in air and broadens the selection of positive electrode materials, as well as a magnesium cell including the electrolytic solution.

DETAILED DESCRIPTION OF THE INVENTION

<Preparation of Electrolytic Solution>

Figure 1:
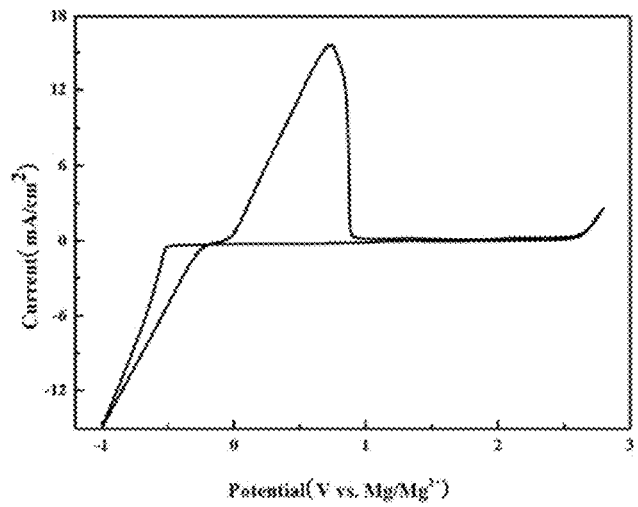
FIG. 1 shows a cyclic voltammogram in a Pt-plate working electrode of a 0.5 M 2-tert-butyl-4-methylphenoxyl-Mg—Al—Cl complex/tetrahydrofuran electrolytic solution obtained in Example 2.

In an inert atmosphere, a predetermined amount of a phenolic (represented by ROH) compound is dissolved in a predetermined amount of an ether solvent, the resulting solution is stirred until a transparent solution is obtained, a solution of a predetermined amount of CH₃CH₂MgX (hereinafter, $CH_3CH_2$ is sometimes abbreviated as Et) in ether is then slowly dropped to the transparent solution, and the resulting solution is stirred for a predetermined time to provide a phenoxyl-Mg-halogen solution. In addition, a predetermined amount of aluminum halide is dissolved in a predetermined amount of an ether solvent, the resulting solution is stirred until a transparent solution is obtained, and then is slowly dropped to the phenoxyl-Mg-halogen solution, and the resulting solution is stirred until the solution is transparent, thereby providing a 0.2 to 1 mol/L phenoxyl-Mg—Al-halogen/ether electrolytic solution.

Herein, reaction formulas are as follows.

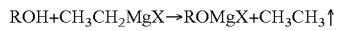

R represents an aryl group optionally substituted with fluorine and/or an alkyl group, and X represents halogen. Further preferably, R represents a phenyl group optionally substituted with fluorine and/or an alkyl group.

Herein, the preparation method of the electrolytic solution is not limited to the above, and may be appropriately modified.

<Measurement of Conductivity>

The 0.2 to 1 mol/L electrolytic solution prepared is placed in an inLab 710 conductivity measuring cell (Mettler Toledo, Switzerland), and the conductivity is measured by an FE30 conductivity meter.

<Cyclic Voltammogram Test>

For a three-electrode glass test cell in a tubular form, metallic platinum (the area thereof is 3.14 $mm^2$) is used for a working electrode, a predetermined amount of the 0.2 to 1 mol/L electrolytic solution is loaded, and metallic magnesium is used for a counter electrode and a reference electrode to assemble the three-electrode system. A cyclic voltammogram test is performed at a scan speed of 1 to 300 mV/S in a glove box under an argon atmosphere.

<Assembly of Cell>

A Ni piece (the area thereof is 0.5 $mm^2$) is used for a base electrode for magnesium deposition, 0.1 to 0.5 mL of the 0.2 to 1 mol/L electrolytic solution is loaded, metallic magnesium is used for a counter electrode, and a porous polyethylene film is used as a diaphragm, to assemble a button-shaped cell. Then, the deposition-dissolution performance of magnesium is determined at a charge-discharge current density of 0.1 to 5 $mA/cm^2$ by performing time control in constant current discharge (magnesium deposition) and voltage control in constant current charge (magnesium dissolution).

A metallic Ni piece (the area thereof is 0.5 $mm^2$) is used for a base electrode for magnesium deposition, 0.1 to 0.5 mL of the 0.2 to 1 mol/L electrolytic solution is loaded, metallic magnesium is used for a counter electrode, and a porous polyethylene film is used as a diaphragm, to assemble a button-shaped cell. Then, electrochemical deposition is performed in conditions of a deposition current density of 0.1 to 10 $mA/cm^2$ and a deposition time of 5 to 24 hours. Thereafter, the cell is disassembled in a glove box under an argon atmosphere and washed with tetrahydrofuran, and the deposit is subjected to measurements by X-ray diffraction (XRD) and scanning electron microscopy (SEM).

The metallic base electrode for use in the present invention is made of copper, aluminum, nickel or silver.

All the steps of preparation of the electrolytic solution and assembly of the cell are performed in a glove box under an argon atmosphere.

Hereinafter, the present invention will be described in more detail with reference to Examples, but the present invention is not limited to the following Examples.

Example 1

In a glove box under an argon atmosphere, 0.3285 g (2 mmol) of 2-tert-butyl-4-methylphenol (ROH) was weighed and dissolved in 1 ml of tetrahydrofuran (hereinafter, referred to as THF) solvent, the resulting solution was stirred by a magnetic stirrer until a transparent solution was obtained, 1 ml of a 2 mol/L $CH_3CH_2MgCl$ solution in THF was then slowly dropped to the transparent solution by a pipette, and the resultant was stirred for about 0.5 hours to provide a 2-tert-butyl-4-methylphenoxyl-Mg—Cl solution (2 mmol). In addition, 0.2667 g (2 mmol) of $AlCl_3$ was dissolved in 2 ml of THF, the resulting solution was stirred by a magnetic stirrer until a transparent solution was obtained, and was then slowly dropped to the 2-tert-butyl-4-methylphenoxyl-Mg—Cl solution, and the resultant was stirred until it was transparent, thereby providing a 0.5 mol/L 2-tert-butyl-4-methylphenoxyl-Mg—Al—Cl complex/tetrahydrofuran electrolytic solution (x=1, x: molar ratio of Lewis salt to Lewis acid; the same shall apply hereafter.).

Four ml of the 0.5 mol/L 2-tert-butyl-4-methylphenoxyl-Mg—Al—Cl complex/tetrahydrofuran electrolytic solution was loaded in an inLab 710 conductivity measuring cell (Mettler Toledo, Switzerland), and the conductivity was measured by an FE30 conductivity meter. The measured conductivity of the electrolytic solution was 1.32 mS/cm.

Platinum was used for a working electrode, 3 ml of the 0.5 mol/L 2-tert-butyl-4-methylphenoxyl-Mg—Al—Cl complex/tetrahydrofuran electrolytic solution (x=1) was loaded, and metallic magnesium was used for a counter electrode and a reference electrode, to assemble a three-electrode system. A cyclic voltammogram test was performed at a scan speed of 50 mV/S in a glove box under an argon atmosphere. The cyclic voltammogram results were as follows: a reduction-oxidation process observed around 0 V vs. Mg corresponded to the deposition and dissolution of magnesium, and the anodic oxidation potential was 2.5 V vs. Mg.

Example 2

In a glove box under an argon atmosphere, 0.3285 g (2 mmol) of 2-tert-butyl-4-methylphenol (ROH) was weighed and dissolved in 1 ml of THF solvent, the resulting solution was stirred by a magnetic stirrer until a transparent solution was obtained, 1 ml of a 2 mol/L $CH_3CH_2MgCl$ solution in THF was then slowly dropped to the transparent solution by a pipette, and the resultant was stirred for about 0.5 hours to provide a 2-tert-butyl-4-methylphenoxyl-Mg—Cl solution (2 mmol). In addition, 0.1333 g (1 mmol) of $AlCl_3$ was dissolved in 2 ml of THF, the resulting solution was stirred by a magnetic stirrer until a transparent solution was obtained, and was then slowly dropped to the 2-tert-butyl-4-methylphenoxyl-Mg—Cl solution, and the resultant was stirred until it was transparent, thereby providing a 0.5 mol/L 2-tert-butyl-4-methylphenoxyl-Mg—Al—Cl complex/tetrahydrofuran electrolytic solution (x=2).

Four ml of the 0.5 mol/L 2-tert-butyl-4-methylphenoxyl-Mg—Al—Cl complex/tetrahydrofuran electrolytic solution was loaded in an inLab 710 conductivity measuring cell (Mettler Toledo, Switzerland), and the conductivity was measured by an FE30 conductivity meter. The measured conductivity of the electrolytic solution was 2.56 mS/cm.

Platinum was used for a working electrode, 3 ml of the 0.5 mol/L 2-tert-butyl-4-methylphenoxyl-Mg—Al—Cl complex/tetrahydrofuran electrolytic solution (x=2) was loaded, and metallic magnesium was used for a counter electrode and a reference electrode, to assemble a three-electrode system. A cyclic voltammogram test was performed at a scan speed of 50 mV/S in a glove box under an argon atmosphere. The cyclic voltammogram results were as follows: as shown in FIG. 1, a reduction-oxidation process observed around 0 V vs. Mg corresponded to the deposition and dissolution of magnesium, and the anodic oxidation potential was 2.6 V vs. Mg.

Figure 3:
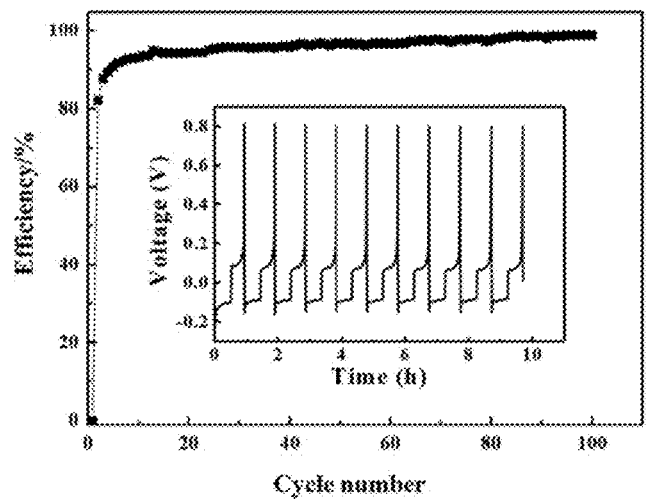
FIG. 3 shows curves of a magnesium deposition-dissolution efficiency and a charge-discharge in Example 2.

A Ni piece was used for a base electrode for magnesium deposition, 0.3 ml of the 0.5 mol/L 2-tert-butyl-4-methylphenoxyl-Mg—Al—Cl complex/tetrahydrofuran electrolytic solution (x=2) was loaded, metallic magnesium was used for a counter electrode, and a polyethylene film was used as a diaphragm, to assemble a button-shaped cell. Then, the magnesium deposition-dissolution performance was determined in conditions of a charge-discharge current of 1 mA/cm$^2$, a discharge time of 30 minutes and a charge-off voltage of 0.8 V vs. Mg. The results of magnesium deposition-dissolution efficiency at the initial stage of cycle were as follows: as shown in FIG. 3, the first cycle efficiency was 82.1%, and the magnesium deposition-dissolution coulomb efficiency after the initial cycle was maintained at 98% or more.

Figure 4:
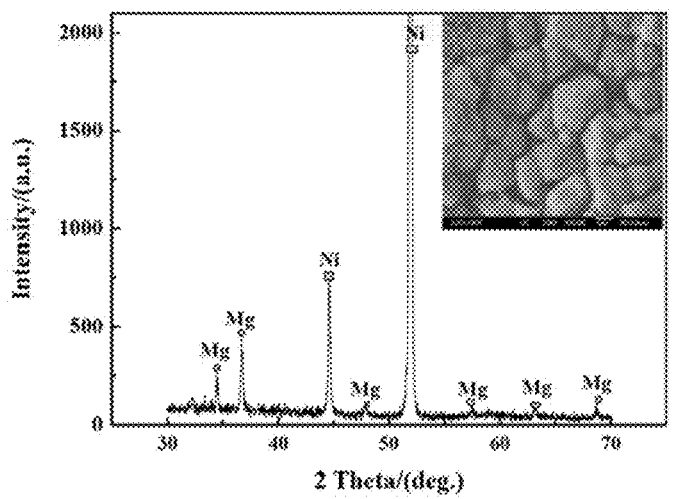
FIG. 4 shows an X-ray diffraction spectrum and a scanning electron micrograph of magnesium deposited in Example 2.

A metallic Ni piece was used for a base electrode for magnesium deposition, 0.3 ml of the 0.5 mol/L 2-tert-butyl-4-methylphenoxyl-Mg—Al—Cl complex/tetrahydrofuran electrolytic solution was loaded, metallic magnesium was used for a counter electrode, and a polyethylene film was used as a diaphragm, to assemble a button-shaped cell. Then, electrochemical deposition was performed in conditions of a deposition current density of 0.2 mA/cm$^2$ and a deposition time of 10 hours. Thereafter, the cell was disassembled in a glove box under an argon atmosphere and washed with tetrahydrofuran, and the deposit was subjected to measurements by X-ray diffraction (XRD) and scanning electron microscopy (SEM). The XRD results were as follows: as shown in FIG. 4, except for diffraction peaks of Ni as a substrate (respectively, 44.5 and 51.9), diffraction peaks observed at 34.45°, 36.79°, 47.99°, 57.61°, 63.30°, 68.73° and the like corresponded to peaks of metallic magnesium (JCPDS 35-0821). From the SEM results (inserted diagram in FIG. 4), a magnesium layer deposited was dense and island-shaped.

Example 3

In a glove box under an argon atmosphere, 0.1882 g (2 mmol) of phenol (ROH) was weighed and dissolved in 1 ml of THF solvent, the resulting solution was stirred by a magnetic stirrer until a transparent solution was obtained, 1 ml of a 2 mol/L CH$_3$CH$_2$MgCl solution in THF was then slowly dropped to the transparent solution by a pipette, and the resultant was stirred for about 0.5 hours to provide a phenoxyl-Mg—Cl solution (2 mmol). In addition, 0.1333 g (1 mmol) of AlCl$_3$ was dissolved in 2 ml of THF solvent, the resulting solution was stirred by a magnetic stirrer until a transparent solution was obtained, and was then slowly dropped to the phenoxyl-Mg—Cl solution, and the resultant was stirred until it was transparent, thereby providing a 0.5 mol/L phenoxyl-Mg—Al—Cl complex/tetrahydrofuran electrolytic solution (x=2).

Four ml of the 0.5 mol/L phenoxyl-Mg—Al—Cl complex/tetrahydrofuran electrolytic solution was loaded in an inLab 710 conductivity measuring cell (Mettler Toledo, Switzerland), and the conductivity was measured by an FE30 conductivity meter. The measured conductivity of the electrolytic solution was 0.99 mS/cm.

Platinum was used for a working electrode, 3 ml of the 0.5 mol/L phenoxyl-Mg—Al—Cl complex/tetrahydrofuran electrolytic solution (x=2) was loaded, and metallic magnesium was used for a counter electrode and a reference electrode, to assemble a three-electrode system. A cyclic voltammogram test was performed at a scan speed of 50 mV/S in a glove box under an argon atmosphere. The cyclic voltammogram results were as follows: a reduction-oxidation process observed around 0 V vs. Mg corresponded to the deposition and dissolution of magnesium, and the anodic oxidation potential was 2.3 V vs. Mg.

Example 4

In a glove box under an argon atmosphere, 0.18 ml (2 mmol) of o-fluorine-phenol (ROH) was weighed and dissolved in 1 ml of THF solvent, the resulting solution was stirred by a magnetic stirrer until a transparent solution was obtained, 1 ml of a 2 mol/L CH$_3$CH$_2$MgCl solution in THF was then slowly dropped to the transparent solution by a pipette, and the resultant was stirred for about 0.5 hours to provide a phenoxyl-Mg—Cl solution (2 mmol). In addition, 0.1333 g (1 mmol) of AlCl$_3$ was dissolved in 2 ml of THF, the resulting solution was stirred by a magnetic stirrer until a transparent solution was obtained, and was then slowly dropped to the phenoxyl-Mg—Cl solution, and the resultant was stirred until it was transparent, thereby providing a 0.5 mol/L o-fluorine-phenoxyl-Mg—Al—Cl complex/tetrahydrofuran electrolytic solution (x=2).

Four ml of the 0.5 mol/L o-fluorine-phenoxyl-Mg—Al—Cl complex/tetrahydrofuran electrolytic solution was loaded in an inLab 710 conductivity measuring cell (Mettler Toledo, Switzerland), and the conductivity was measured by an FE30 conductivity meter. The measured conductivity of the electrolytic solution was 2.02 mS/cm.

Platinum was used for a working electrode, 3 ml of the 0.5 mol/L o-fluorine-phenoxyl-Mg—Al—Cl complex/tetrahydrofuran electrolytic solution (x=2) was loaded, and metallic magnesium was used for a counter electrode and a reference electrode, to assemble a three-electrode system. A cyclic voltammogram test was performed at a scan speed of 50 mV/S in a glove box under an argon atmosphere. The cyclic voltammogram results were as follows: a reduction-oxidation process observed around 0 V vs. Mg corresponded to the deposition and dissolution of magnesium, and the anodic oxidation potential was 2.6 V vs. Mg.

Example 5

Figure 2:
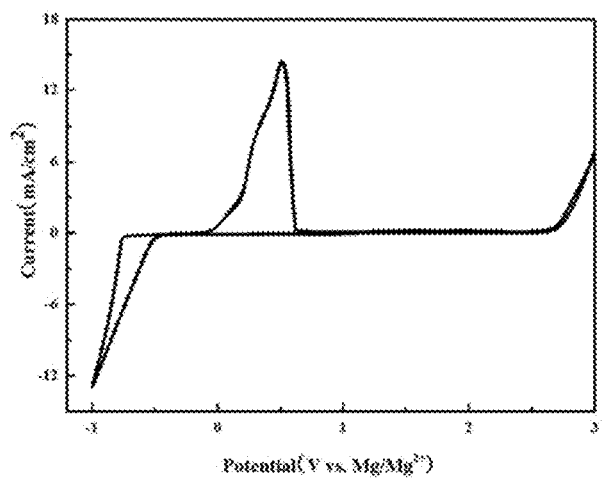
FIG. 2 shows a voltage-current curve of ten cycles in a Pt-plate working electrode of a 0.5 mol/L 2-tert-butyl-4-methylphenoxyl-Mg—Al—Cl complex/tetrahydrofuran electrolytic solution obtained in Example 5.

Platinum was used for a working electrode, 3 ml of the 0.5 mol/L 2-tert-butyl-4-methylphenoxyl-Mg—Al—Cl complex/tetrahydrofuran electrolytic solution (x=2) prepared by the same method as in Example 2 was loaded, and metallic magnesium was used for a counter electrode and a reference electrode, to assemble a three-electrode system. A cyclic voltammogram test was performed at a scan speed of 50 mV/S in air. The cyclic voltammogram results were as follows: as shown in FIG. 2, a reduction-oxidation process observed around 0 V vs. Mg corresponded to the deposition and dissolution of magnesium, the anodic oxidation potential was about 2.7 V vs. Mg, and an excellent repeating property was maintained in ten cycles.

Example 6

A 0.5 mol/L 2-tert-butyl-4-methylphenoxyl-Mg—Al—Cl complex (x=2)/mixed ether (volume ratio of tetraethylene glycol dimethyl ether:tetrahydrofuran=1:1) solution was prepared in a glove box under an argon atmosphere by the same method as in Example 2 except that a mixed liquid of tetraethylene glycol dimethyl ether and tetrahydrofuran in a volume ratio of 1:1 was used as a solvent, and the solution was used for an electrolytic solution for a magnesium secondary battery. The electrolytic solution could result in a significant reduction in volatility of tetrahydrofuran solvent and a notable enhancement in safety. Four ml of the electrolytic solution was loaded in an inLab 710 conductivity measuring cell (Mettler Toledo, Switzerland), and the conductivity was measured by an FE30 conductivity meter. The measured conductivity of the electrolytic solution was 0.98 mS/cm.

Figure 5:
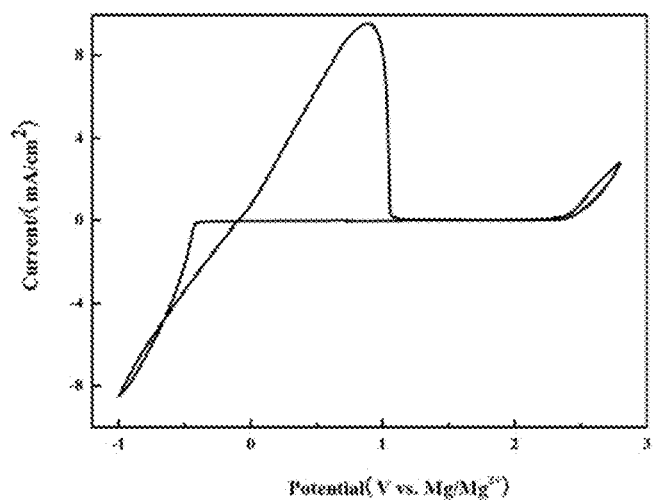
FIG. 5 shows a stable cyclic voltammogram in a Pt-plate working electrode of a 0.5 mol/L 2-tert-butyl-4-methylphenoxyl-Mg—Al—Cl complex/mixed ether electrolytic solution obtained in Example 5.

Platinum was used for a working electrode, 3 ml of the 0.5 mol/L electrolytic solution was loaded, and metallic magnesium was used for a counter electrode and a reference electrode, to assemble a three-electrode system. A cyclic voltammogram test was performed at a scan speed of 50 mV/S in a glove box under an argon atmosphere. The cyclic voltammogram results were as follows: a reduction-oxidation process observed around 0 V vs. $Mg/Mg^{2+}$ corresponded to the deposition and dissolution of magnesium, and the anodic oxidation potential was 2.4 V vs. $Mg/Mg^{2+}$ or more (FIG. 5).

Comparative Example 1

Figure 6:
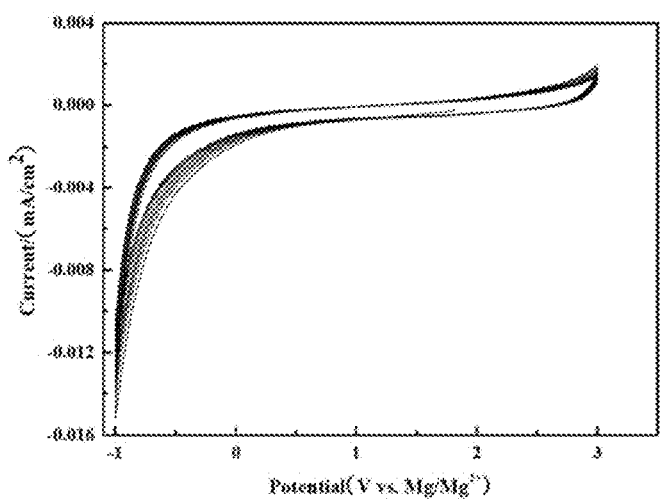
FIG. 6 shows a cyclic voltammogram in a Pt-plate working electrode of a 0.5 mol/L (PhMgCl)$_z$—AlCl₃/tetrahydrofuran electrolytic solution obtained in Comparative Example 1.

Platinum was used for a working electrode, 3 ml of a 0.5 mol/L $(PhMgCl)_2$—$AlCl_3$/tetrahydrofuran electrolytic solution (namely, "second generation electrolytic solution") was loaded, and metallic magnesium was used for a counter electrode and a reference electrode, to assemble a three-electrode system. A cyclic voltammogram test was performed at a scan speed of 50 mV/S in air. The cyclic voltammogram results were as follows: as shown in FIG. 6, the reduction-oxidation process corresponding to the deposition and dissolution of magnesium was not observed around 0 V vs. $Mg/Mg^{2+}$.

As can be seen from Examples 1 to 6 and Comparative Example 1, a magnesium cell including an electrolytic solution containing a solute, which was phenoxyl-Mg—Al-halogen complex, and an ether solvent was high in anodic oxidation potential and excellent in cycle repeating property, and exhibited a reduction-oxidation process corresponding to the deposition and dissolution of magnesium around 0 V vs. $Mg/Mg^{2+}$. Accordingly, the inventive rechargeable magnesium cell using a solute, which was phenoxyl-Mg—Al-halogen complex, and an ether solvent can exist stably in air and broaden the selection of a positive electrode material.

The invention claimed is:

1. An electrolytic solution for a magnesium cell, containing:
   a solute, which is phenoxyl-Mg—Al-halogen complex; and
   an ether solvent.

2. The electrolytic solution for a magnesium cell according to claim 1, wherein the solute is a reaction product of a Lewis salt, which is ROMgX, and a Lewis acid, which is $AlCl_3$, wherein R represents an aryl group optionally substituted with fluorine and/or an alkyl group, and X represents halogen.

3. The electrolytic solution for a magnesium cell according to claim 2, wherein R represents a phenyl group optionally substituted fluorine and/or with an alkyl group.

4. The electrolytic solution for a magnesium cell according to claim 2, wherein a molar ratio of the ROMgX to the $AlCl_3$ is 1 to 3.

5. The electrolytic solution for a magnesium cell according to claim 1, wherein a concentration of the solute in the entire electrolytic solution is 0.2 to 1 mol/L.

6. The electrolytic solution for a magnesium cell according to claim 2, wherein the ROMgX is at least one selected from the group consisting of

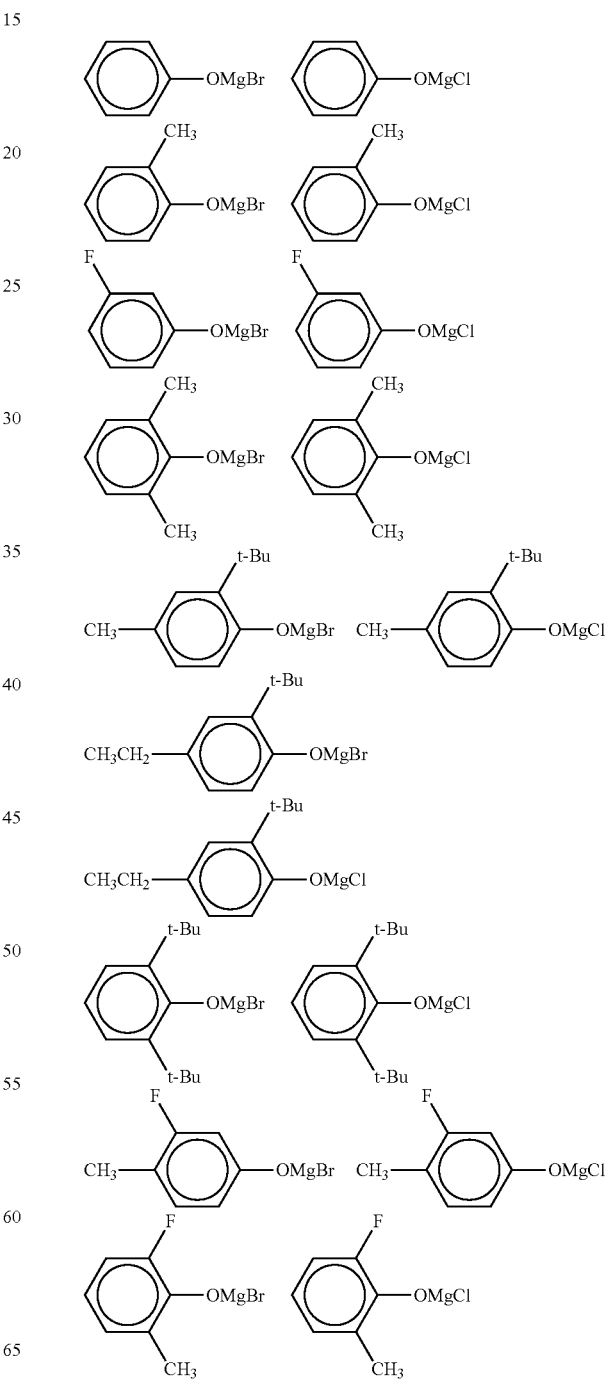

-continued

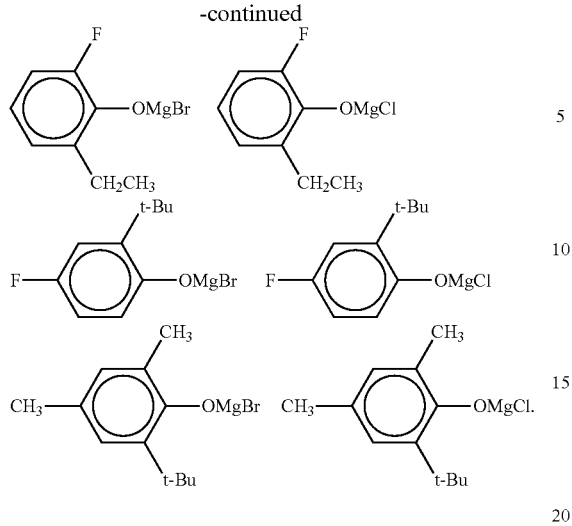

7. The electrolytic solution for a magnesium cell according to claim 1, wherein the ether solvent is at least one selected from the group consisting of tetrahydrofuran, ethylene glycol dimethyl ether, diethylene glycol dimethyl ether, 2-methyltetrahydrofuran, ethyl ether, and tetraethylene glycol dimethyl ether.

8. A magnesium cell comprising the electrolytic solution according to claim 1.

\* \* \* \* \*